(12) United States Patent
He et al.

(10) Patent No.: US 10,357,742 B2
(45) Date of Patent: Jul. 23, 2019

(54) METHOD OF INHIBITING FORMATION OF DIOXINS AND DIOXIN-LIKE COMPOUNDS IN SOLID WASTE INCINERATION FLUE GAS

(71) Applicant: TONGJI UNIVERSITY, Shanghai (CN)

(72) Inventors: Pinjing He, Shanghai (CN); Hua Zhang, Shanghai (CN); Sijia Wang, Shanghai (CN); Liming Shao, Shanghai (CN); Fan Lyu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 0 days.

(21) Appl. No.: 15/408,600

(22) Filed: Jan. 18, 2017

(65) Prior Publication Data

US 2017/0120189 A1 May 4, 2017

Related U.S. Application Data

(63) Continuation of application No. PCT/CN2016/084049, filed on May 31, 2016.

(30) Foreign Application Priority Data

Sep. 1, 2015 (CN) .......................... 2015 1 0552021

(51) Int. Cl.
*B01D 53/78* (2006.01)
*B01D 53/68* (2006.01)

(52) U.S. Cl.
CPC .............. *B01D 53/78* (2013.01); *B01D 53/68* (2013.01); *B01D 2251/206* (2013.01);
(Continued)

(58) Field of Classification Search
None
See application file for complete search history.

(56) References Cited

U.S. PATENT DOCUMENTS

| 5,531,798 A * | 7/1996 | Engstrom | B01D 46/002 110/345 |
| 5,586,995 A * | 12/1996 | Vollhardt | B01D 53/025 261/98 |

(Continued)

FOREIGN PATENT DOCUMENTS

| AT | 503789 | 1/2008 |
| CN | 101249378 | 8/2008 |

(Continued)

OTHER PUBLICATIONS

Olie et al., "Metals as Catalysts during the Formation and Decomposition of Chlorinated Dioxins and Furans in Incineration Processes", Journal of the Air & Waste Management Association, vol. 48, Feb. 1998, pp. 101-105. (Year: 1998).*

(Continued)

*Primary Examiner* — Anita Nassiri-Motlagh
(74) *Attorney, Agent, or Firm* — Hamre, Schumann, Mueller & Larson, P.C.

(57) ABSTRACT

The present invention relates to a method for inhibiting the formation of dioxin-like compounds in solid waste incineration flue gases, belonging to the field of cleaning of solid waste incineration flue gases. In accordance with the present invention, when incineration flue gases cool down to 500~450° C., the flue gases are introduced into an inhibition reactor where copper chlorides in flue gas particulates mix and react with inhibitors to convert into copper metaphosphate so as to inactivate the copper chlorides which can catalyze the formation of dioxin-like compounds and control dioxin-like compound pollutants in incineration flue gases at the source. Compared with the prior art, the invention can effectively control the main formation ways of dioxin-like compounds in solid waste incineration flue gases by optimizing inhibitors and reaction conditions. The method of the invention does not affect the residual heat utilization of solid (Continued)

waste incineration flue gases, so solid waste incineration has a better resource utilization effect. The ammonium dihydrogen phosphate inhibitor used in the invention has the advantages of high inhibition efficiency, strong operability, low cost and environment protection, providing the technology with good application feasibility.

7 Claims, 1 Drawing Sheet

(52) U.S. Cl.
CPC .... *B01D 2251/61* (2013.01); *B01D 2257/204* (2013.01); *B01D 2258/0291* (2013.01); *B01D 2259/124* (2013.01)

(56) References Cited

U.S. PATENT DOCUMENTS

| | | | | |
|---|---|---|---|---|
| 5,968,467 | A * | 10/1999 | Karasek | B01D 53/02 110/345 |
| 6,291,737 | B1 * | 9/2001 | Miyata | A62D 3/34 423/210 |
| 2001/0006613 | A1 * | 7/2001 | Masaki | B01D 53/8662 423/215.5 |

FOREIGN PATENT DOCUMENTS

| | | | |
|---|---|---|---|
| CN | 101766951 | 7/2010 | |
| CN | 101949546 | 1/2011 | |
| CN | 102847419 | 1/2013 | |
| CN | 103657343 | 3/2014 | |
| CN | 204478079 | 7/2015 | |
| CN | 105080325 | 11/2015 | |
| GB | 2402085 A | * 12/2004 | ............ B01D 47/06 |

OTHER PUBLICATIONS

International Search Report (English and Chinese) and Written Opinion of International Application No. PCT/CN2016/084049, dated Aug. 15, 2016, 10 pages.

Relevant citation from China Statistical Yearbook 2016, http://www.stats.gov.cn/tjsj/ndsj/2016/indexch.htm, Chinese version was published in Sep. 1, 2016, ISBN: 9787503779176, tables found in section 8, item 20; with English and Chinese, 3 pages provided.

Cao et al., "Technical Specifications for Centralized Incineration Facility Construction on Hazardous Waste (HJ/T176-2005)", China Academic Journal Electronic Publishing House, No. 1002-3364 (2005) 09-0015-06, with English abstract, 9 pages.

Ma et al., "Influence factors and control means of de novo synthesis of PCDD/F", China Academic Journal Electronic Publishing House, No. 1000-6613 (2006) 05-0557-06, with English abstract, 6 pages.

\* cited by examiner

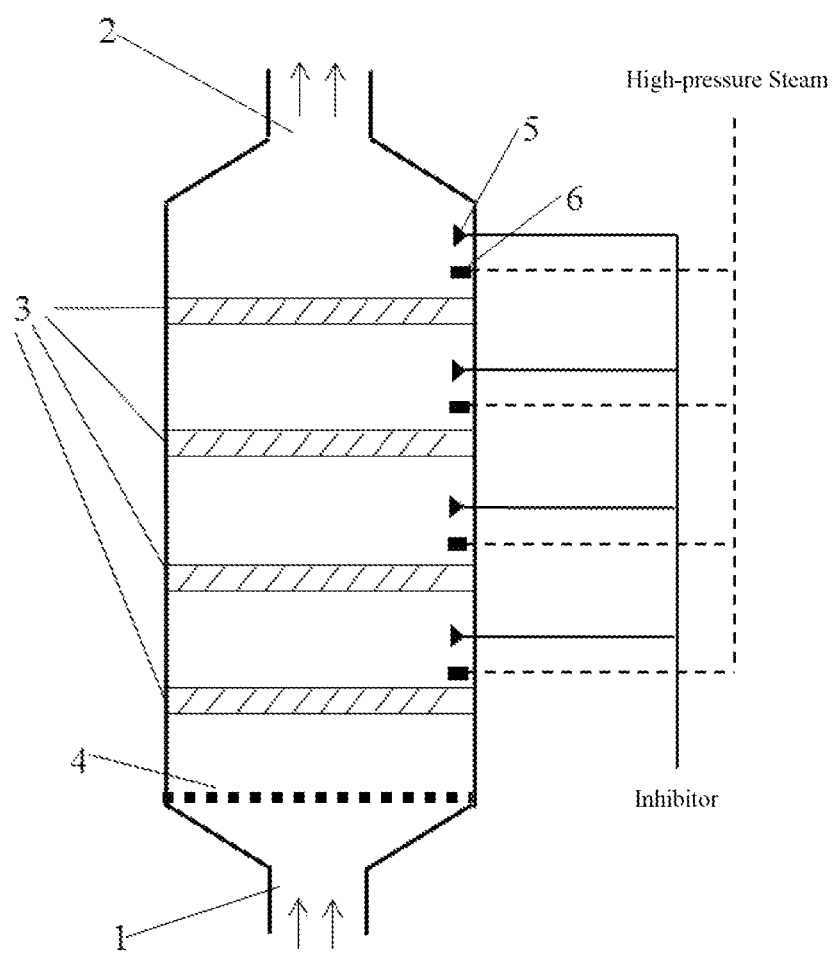

METHOD OF INHIBITING FORMATION OF DIOXINS AND DIOXIN-LIKE COMPOUNDS IN SOLID WASTE INCINERATION FLUE GAS

BACKGROUND OF THE INVENTION

Technical Field

The present invention belongs to the field of cleaning of solid waste incineration flue gases, and more specifically, to a method for inhibiting the formation of dioxin-like compounds in solid waste incineration flue gases.

Description of Related Art

The incineration technology with the advantages of waste minimization, high efficiency of organic matter decomposition and energy recovery is one of the main means of solid waste treatment. According to the "China Statistical Yearbook 2016", the quantity of collected municipal solid waste in China was 191 million tons in 2015, with incineration quantity accounting for 32.3%; incineration is also the main way to treat industrial hazardous waste and medical waste, and all provincial-level hazardous waste treatment centers successively set up in the recent decade take incineration as one of the main treatment means. As one of the main byproducts of solid waste incineration, the flue gas contains a variety of gaseous and particulate pollutants. Among them, dioxin-like compounds are persistent organic pollutants, highly toxic and accumulating in the environment. At present, the flue gases are cleaned of dioxin-like compounds mainly by spraying powdered activated carbon before a bag filter which removes dioxin-like compounds by formation and adsorption of a powdered activated carbon film on the surface of the filter bag; however, the removal rate of the method is relatively low, with the maximum not more than 50%, so it is difficult to radically control the dioxin-like compound pollution.

Due to the lack of a high-efficiency cleaning method at the end, it is necessary to explore a technology which can control dioxin-like compounds in flue gases at the source. According to the research in recent years (Advancement in Study on Formation Mechanism of Dioxin in MSW Incinerators, Thermal Power Generation, 34 (2005), 15-20, by Cao Yuchun, Yan Jianhua, Li Xiaodong, Chen Tong and Cen Kefa), dioxin-like compounds may be formed in four ways during the incineration of solid waste: 1) The release of dioxins that originally exist in the solid waste in the incinerator; 2) the gas-phase synthesis of dioxins at a high temperature in the incinerator; 3) the formation of dioxins after the incinerator through de novo synthesis when the flue gases cool down to a specific temperature range; and 4) the formation of dioxins after the incinerator through synthesis of precursors when the flue gases cool down to a specific temperature range. In the ways mentioned above, dioxins are not industrial products and solid waste originally contain an extremely low amount of dioxins, so the contribution of the first way to the formation of dioxins in incineration is almost negligible; both the second and the fourth ways take chlorophenol, polychlorinated biphenyl and other organic chlorinated compounds as raw materials for dioxin synthesis, and these organic chlorinated compounds have an extremely high conversion rate in modern solid waste incinerators with strict temperature, material mixture and gas retention time control measures and the content of the dioxins in the flue gases is extremely low, so the two ways are unlikely to become the main contributor of dioxin formation in incineration due to the restriction of the amount of raw materials; while the third way has currently been identified as the main way of dioxins formation in incineration flue gases and should be the key link for controlling flue gas dioxins at the source for there is no restriction by raw materials of dioxin synthesis, as it takes simple materials (CO and HCl in the flue gases, and carbon residues in particulates, etc.) as raw reactants. Therefore, according to China's "Technical Specifications for Centralized Incineration Facility Construction on Hazardous Waste (HJ/T176-2005)", the high-temperature flue gases produced by waste incineration shall be cooled down to below 200° C. within 1.0 s through rapid cooling treatment so as to shorten the retention time of the flue gases in a temperature range of 200~500° C.; this temperature range is an appropriate temperature interval for the de novo synthesis of dioxin-like compounds. But the cooling method by direct heat exchange of water and high-temperature flue gases that is adopted in the rapid cooling treatment is restricted by the concurrent transfer rate of heat and mass, so it is actually difficult to achieve the required cooling rate; at the same time, the rapid cooling treatment makes it impossible to recover the residual heat of the flue gases (power generation), so the method cannot be applied in the solid waste incineration relying on power generation to compensate costs.

Chinese Patent No. CN 101766951A discloses a system for inhibiting the formation of dioxins in waste incineration, comprising an incinerator, a cooling unit and a first separating unit which are sequentially connected, wherein the cooling unit is used for recovering some heat energy and cooling the flue gases containing fly ash generated in the incinerator to a temperature range of 400~800° C., and the first separating unit is used for the removal of fly ash containing chlorides, organic chlorides and heavy metal particles from the flue gases after the cooling treatment in the cooling unit, as well as the removal of transition metal cations which acts as catalysts in dioxins formation. This invention inhibits or reduces the formation of dioxins by a physical ash-removing method only, and has a poor inhibition effect.

Chinese Patent No. CN 204478079U discloses a rapid cooling unit for inhibiting the re-synthesis of dioxins in flue gases in a low-temperature pyrolysis incinerator, wherein the flue gases enter a flue gas inlet end from the bottom of the rapid cooling unit, evenly flows upward through a grating and over heat exchange carriers, and finally goes out from a flue gas outlet end; a cooling water circulation system comprises a cooling water machine, a water pump, a cooling water spray device and a backwater tank, wherein the flue gas flow lines are upward and parallel to each other, the cooling water is sprayed on the heat exchange carriers to cool the flue gases, and the flue gases and the cooling water flow in a opposite direction, to rapidly cool the upward flue gases from 700° C. to below 200° C. within 2 s, but the cooling method by direct heat exchange of water and high-temperature flue gases that is adopted in the rapid cooling treatment is restricted by the concurrent transfer rate of heat and mass, so it is actually difficult to achieve the required cooling rate; at the same time, the rapid cooling treatment makes it impossible to recover the residual heat of the flue gases (power generation) to be implemented, so that the method cannot be applied in the solid waste incineration relying on power generation to compensate costs.

The de novo synthesis of dioxin-like compounds is a catalytic process, and a large number of studies have revealed that the key catalyst in this process is copper chloride ($CuCl_2$) which is more than ten times other known catalytically active substances in the capability of catalyzing the formation of dioxin-like compounds (Influencing Factors and Control Means of De novo Synthesis of PCDD/F, Chemical Industry and Engineering Progress, 25(2006), 557-562, by Ma Hongting and Zhang Yufeng), wherein the main role of $CuCl_2$ in catalyzing the formation of dioxin-like compounds is direct decomposition to provide chlorine atoms for carbon atoms to form C—Cl bonds; form chlorinated aromatic compounds via C—C bond cleavage and then form tricyclic chlorides (dioxin-like compounds) via condensation and other reactions. Obviously, converting $CuCl_2$ contained in the incineration flue gas into a catalytically inert substances before reaching the appropriate catalytic reaction temperature range (200~450° C.) is an effective method to inhibit the formation of the dioxin-like compounds in solid waste incineration flue gases.

BRIEF SUMMARY OF THE INVENTION

In view of the lack of a method of controlling dioxin-like compounds in solid waste incineration flue gases at the source, the present invention provides a method for inhibiting the formation of dioxin-like compounds in solid waste incineration flue gases.

To achieve the objective, the present invention adopts the following technical solution:

Method of inhibiting formation of dioxins and dioxin-like compounds in solid waste incineration flue gas, wherein when the incineration flue gases cool down to 500~450° C., the flue gases are introduced into an inhibition reactor where copper chlorides in flue gas particulates mix and react with inhibitors to convert into copper metaphosphate.

The inhibition reactor is provided inside with layered ceramic honeycomb packing, wherein the thickness of each packing layer is 50~100 mm, the hole opening ratio of packing is 75~85% and the height spacing of the layers is 600~800 mm; the inhibitors are sprayed into the reactor through the nozzles in the reactor wall between two packing layers, with the intention time of the flue gases being 1.5~2.5 s.

The inhibitor is ammonium dihydrogen phosphate which is uniformly mixed with water in a mass ratio of 1:4 to form a pulp, and the pulp is atomized and sprayed into the inhibition reactor in a ratio of 10~15 g/$Nm^3$ via the nozzle, taking the volume of the treated flue gases in the standard state as the reference.

The conversion of $CuCl_2$ to copper metaphosphate ($Cu(PO_3)_2$) via ammonium dihydrogen phosphate ($NH_4H_2PO_4$) can be realized through the following reaction processes, and the experiment also confirms that ($Cu(PO_3)_2$) is not capable of catalyzing the formation of dioxin-like compounds.

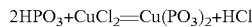

The above-mentioned conversion of $CuCl_2$ to $Cu(PO_3)_2$ can occur instantaneously in the temperature range of 200~900° C., which meets the requirement for application in the process of flue gas cooling.

The inhibition reactor is cylindrical, with a height-to-diameter ratio of 4.5:1~5.5:1.

The plane shape of the packing holes is regular quadrangle or hexagon, with the side length of the regular-quadrangular or -hexagonal holes being 50~100 mm.

The inhibition reactor wall is provided with high-pressure steam nozzles used to blow off ash deposits on the surface of packing.

A gas flow distribution plate is arranged near the flue gas inlet in the inhibition reactor which can uniformly distribute the flue gases.

Compared with the prior art, the advantages and beneficial effects of the present invention are as below:

1) The invention can effectively control the main formation ways of dioxin-like compounds in solid waste incineration flue gases by optimizing inhibitors and reaction conditions.

2) The control method of the invention does not affect the residual heat utilization of solid waste incineration flue gases, so solid waste incineration has a better resource utilization effect.

3) The ammonium dihydrogen phosphate inhibitor used in the invention has the advantages of high inhibition efficiency, strong operability, low cost and environment protection, providing the technology with good application feasibility.

BRIEF DESCRIPTION OF THE SEVERAL VIEWS OF THE DRAWINGS

FIG. 1 is a structural diagram of the inhibition reactor.

In the figure, 1-flue gas inlet, 2-flue gas outlet, 3-packing layer, 4-gas flow distribution plate, 5-inhibitor nozzle, 6-high-pressure steam nozzle.

DETAILED DESCRIPTION OF THE INVENTION

The present invention is further detailed in combination with the drawings and embodiments as follows.

Embodiment 1:

A solid waste incinerator has a treatment capacity of 10 t/h, and the flue gas flow rate in stable operation is about 54000 $Nm^3/h$ (15 $Nm^3/s$). The incineration flue gases flow out of an incinerator at an average temperature of 850° C., cool down to about 480° C. through heat exchange in a boiler and a superheater, and then enter an inhibition reactor.

As shown in FIG. 1, the inhibition reactor is a cylinder, with a diameter of 2.8 m, a height of 7 m and an internal volume of 86 $m^3$. A flue gas inlet 1 is made at the lower end of the reactor while a flue gas outlet 2 is made at the upper end of the reactor, the upper and lower parts of the reactor are respectively made with an about lm high flow-guide section, and a truncated conical flow distribution plate 4 is arranged above the flue gas inlet 1 for uniformly distributing the flue gases. The inhibition reactor is provided inside with seven ceramic honeycomb packing layers 3 in total in the middle section (thickness: 0.1 m per layer, total height of packing: 4.9 m), with an interval of 0.7 m. The ceramic honeycomb packing is 0.1 m thick and uniformly made with hexagonal holes with a side length of 60 mm. Inhibitor nozzles 5 and high-pressure steam nozzles 6 are arranged in the reactor wall higher than each packing layer; the inhibitor nozzles 5 are mounted with the axis 0.35 m higher than the upper surface of the packing layer 3 and the high-pressure steam nozzles 6 are mounted 0.15 m higher than the upper surface of the packing layer. The inhibitor nozzles 5 and the high-pressure steam nozzles 6 are mounted on the same vertical line, eight inhibitor nozzles 5 and eight high-pressure steam nozzles 6 (56 inhibitor nozzles and 56 high-pressure steam nozzles in total in the reactor) are mounted higher than each packing layer, and the nozzles are uniformly distributed along the circumference of the reactor wall.

The flue gases flow through the inhibitor reactor from bottom to top, with its retention time in the reactor being about 2.0 s; the consumption of the pulp inhibitors prepared by uniformly mixing ammonium dihydrogen phosphate and water at a mass ratio of 1:4 is 648 kg/h, and the inhibitors are uniformly distributed to all nozzles and sprayed in a pulse mode into the reactor every 0.5 s to react with $CuCl_2$ in flue gases particulates and convert $CuCl_2$ into copper metaphosphate so as to inhibit the formation of dioxin-like compounds. High-pressure steam (about 0.8 MPa) is sprayed in a pulse mode onto the upper surface of packing layers also every 0.5 s to prevent particulates in flue gases from accumulating on the packing and also to improve the turbulent mixing in the reactor so as to make the reaction more complete.

The experiment shows that no $CuCl_2$ is found in the fly ash of the flue gases through the reactor, and the content of de novo synthesis intermediates (chlorobenzene and chlorophenol) of dioxin-like compounds in flue gases is reduced by over 80% compared with the control.

Embodiment 2:
Method of inhibiting formation of dioxins and dioxin-like compounds in solid waste incineration flue gas, wherein when the incineration flue gases cool down to 500~450° C., the flue gases are introduced into an inhibition reactor where copper chlorides in flue gas particulates react and mix with inhibitors to convert into copper metaphosphate.

Wherein, the differences from Embodiment 1 are that the inhibitor reactor is cylindrical and the height-to-diameter ratio is 4.5:1. The inhibition reactor is provided inside with layered ceramic honeycomb packing, wherein the thickness of each packing layer is 50 mm, the hole opening ratio of packing is 75% and the plane shape of the packing holes is regular hexagon with the side length of the hole being 50 mm. The height spacing of the packing layers is 600 mm; the inhibitors are sprayed into the reactor via the inhibitor nozzles in the reactor wall between two packing layers, and the inhibition reactor wall is provided with high-pressure steam nozzles used to blow off ash deposits on the surface of packing.

The flue gases flow through the inhibitor reactor from bottom to top, with its retention time in the reactor being about 1.5 s; ammonium dihydrogen phosphate is uniformly mixed with water in a mass ratio of 1:4 to form a pulp, and the pulp is atomized and sprayed into the inhibition reactor in a ratio of 10 g/Nm$^3$ via the nozzles, taking the volume of the treated flue gases in standard state as the reference.

The experiment shows that no $CuCl_2$ is found in the fly ash of flue gases through the reactor, and the content of de novo synthesis intermediates (chlorobenzene and chlorophenol) of dioxin-like compounds in flue gases are reduced by 81.5% compared with the control.

Embodiment 3:
Method of inhibiting formation of dioxins and dioxin-like compounds in solid waste incineration flue gas, wherein when the incineration flue gases cool down to 500~450° C., the flue gases are introduced into an inhibition reactor where copper chlorides in flue gas particulates mix and react with inhibitors to convert into copper metaphosphate.

Wherein the differences from Embodiment 1 are that the inhibitor reactor is cylindrical and the height-to-diameter ratio is 5:1. The inhibition reactor is provided inside with layered ceramic honeycomb packing, wherein the thickness of each packing layer is 80 mm, the hole opening ratio of packing is 80% and the plane shape of the packing holes is regular quadrangle with the side length of the hole being 80 mm. The height spacing of the packing layers is 700 mm; the inhibitors are sprayed into the reactor via the inhibitor nozzles in the reactor wall between two packing layers, and the inhibition reactor wall is provided with high-pressure steam nozzles used to blow off ash deposits on the surface of packing.

The flue gases flow through the inhibitor reactor from bottom to top, with its retention time in the reactor being about 2.0 s; ammonium dihydrogen phosphate is uniformly mixed with water in a mass ratio of 1:4 to form a pulp, and the pulp is atomized and sprayed into the inhibition reactor in a ratio of 12 g/Nm$^3$ via the nozzles, taking the volume of the treated flue gases in standard state as the reference.

The experiment shows that no $CuCl_2$ is found in the fly ash of flue gases through the reactor, and the content of de novo synthesis intermediates (chlorobenzene and chlorophenol) of dioxin-like compounds in flue gases are reduced by 83% compared with the contrast.

Embodiment 4:
Method of inhibiting formation of dioxins and dioxin-like compounds in solid waste incineration flue gas, wherein when the incineration flue gases cool down to 500~450° C., the flue gases are introduced into an inhibition reactor where copper chlorides in flue gas particulates mix and react with inhibitors to convert into copper metaphosphate.

Wherein the differences from Embodiment 1 are that the inhibitor reactor is cylindrical and the height-to-diameter ratio is 5.5:1. The inhibition reactor is provided inside with layered ceramic honeycomb packing, wherein the thickness of each packing layer is 100 mm, the hole opening ratio of packing is 85% and the plane shape of the packing holes is regular quadrangle with the side length of the hole being 100 mm. The height spacing of the packing layers is 800 mm; the inhibitors are sprayed into the reactor via the inhibitor nozzles in the inhibitor wall between two packing layers, and the inhibition reactor wall is provided with high-pressure steam nozzles used to blow off ash deposits on the surface of packing.

The flue gases flow through the inhibitor reactor from bottom to top, with its retention time in the reactor being about 2.5 s; ammonium dihydrogen phosphate is uniformly mixed with water in a mass ratio of 1:4 to form a pulp, and the pulp is atomized and sprayed into the inhibition reactor in a ratio of 15 g/Nm$^3$ via the nozzle, taking the volume of the treated flue gases in standard state as the reference.

The experiment shows that no $CuCl_2$ is found in the fly ash of flue gases through the reactor, and the content of de novo synthesis intermediates (chlorobenzene and chlorophenol) of dioxin-like compounds in flue gases are reduced by 85% compared with the control.

The embodiments described above are intended to help those skilled in the art understand and use the invention. Obviously, those skilled in the art could easily make various amendments for these embodiments and apply the general principle described herein into other embodiments without any creative labor. Therefore, the above-mentioned embodiments are not intended to limit the present invention and any amendments and modifications made by those skilled in the art based on the disclosed invention without departing from the scope of the invention shall be included in the protection scope of the present invention.

What is claimed is:
1. A method of inhibiting formation of dioxins and dioxin-like compounds in solid waste incineration flue gas comprising:

cooling solid waste incineration flue gas down to 500~450° C.; uniformly mixing an inhibitor with water in a mass ratio of 1:4 to form a pulp, and atomizing and spraying the pulp into an inhibition reactor in a pulse mode at a flow rate of 10~15 g/Nm$^3$ via inhibitor nozzles; and introducing the solid waste incineration flue gas into the inhibition reactor where copper chloride in particulates of the solid waste incineration flue gas mixes and reacts with the inhibitor to be converted into copper metaphosphate, wherein the inhibitor contains ammonium dihydrogen phosphate, the solid waste incineration flue gas is fed to an inlet nozzle at the bottom of the inhibitor inhibition reactor, and the solid waste incineration flue gas flows through the inhibitor inhibition reactor from bottom to top of the inhibitor inhibition reactor.

2. The method of inhibiting formation of dioxins and dioxin-like compounds in solid waste incineration flue gas as claimed in claim 1, wherein the inhibition reactor includes layered ceramic honeycomb packing therein, each layer of the layered ceramic honeycomb packing has a thickness of 50~100 mm, a hole opening ratio of 75~85%, and a height spacing of 600~800 mm, the inhibitor is sprayed into the inhibition reactor via inhibitor nozzles in a wall of the inhibition reactor between two layers of the layered ceramic honeycomb packing, and, the solid waste incineration flue gas has a retention time of 1.5~2.5 s in the inhibition reactor.

3. The method of inhibiting formation of dioxins and dioxin-like compounds in solid waste incineration flue gas as claimed in claim 2, wherein the inhibition reactor is cylindrical with a height-to-diameter ratio of 4.5:1~5.5:1.

4. The method of inhibiting formation of dioxins and dioxin-like compounds in solid waste incineration flue gas as claimed in claim 2, wherein holes of each layer of the layered ceramic honeycomb packing holes have a plane shape of regular quadrangle or hexagon with a side length being 50~100 mm.

5. The method of inhibiting formation of dioxins and dioxin-like compounds in solid waste incineration flue gas as claimed in claim 2, wherein the inhibition reactor wall is provided with pressure steam nozzles to blow off ash deposits on a surface of the layered ceramic honeycomb packing.

6. The method of inhibiting formation of dioxins and dioxin-like compounds in solid waste incineration flue gas as claimed in claim 2, wherein a gas flow distribution plate is arranged near an inlet of the inhibition reactor and is configured to uniformly distribute the solid waste incineration flue gas.

7. The method of inhibiting formation of dioxins and dioxin-like compounds in solid waste incineration flue gas as claimed in claim 5, wherein the pressure steam nozzles are in a wall of the inhibition reactor between two layers of the layered ceramic honeycomb packing.

* * * * *